United States Patent [19]

Tward

[11] 4,423,638

[45] Jan. 3, 1984

[54] CAPACITIVE SYSTEM FOR MANOMETRIC DETECTION AND MEASUREMENT OF DIFFERENTIAL PRESSURES

[75] Inventor: Emanuel Tward, Northridge, Calif.

[73] Assignee: Tward 2001 Limited, Los Angeles, Calif.

[21] Appl. No.: 383,791

[22] Filed: Jun. 1, 1982

[51] Int. Cl.³ .............................................. G01L 9/12
[52] U.S. Cl. ....................................... 73/749; 361/283
[58] Field of Search .................. 73/749, 708; 361/283, 361/284

[56] References Cited

U.S. PATENT DOCUMENTS

| | | | |
|---|---|---|---|
| 2,703,876 | 3/1955 | Edmundson | 73/749 |
| 2,746,295 | 5/1956 | Lubkin | 73/749 |
| 3,190,122 | 6/1965 | Edwards | 73/749 |
| 3,218,863 | 11/1965 | Calvert | 73/749 |

Primary Examiner—Donald O. Woodiel
Attorney, Agent, or Firm—Philip D. Junkins

[57] ABSTRACT

A manometric method and instrument for the continuous detection and measurement of differential pressures which includes a uniquely configured multi-capacitor sensor system. The sensor system is formed of a first pair of plate type capacitors having like dielectric spaces within which a first strata of fluids is maintained and subjected to one pressure force and a second pair of plate type capacitors having like dielectric spaces within which a second strata of fluids is maintained and subjected to another pressure force. The dielectric spaces of each pair of capacitors are interconnected at their lower ends so that the pairs of dielectric spaces form the legs of a classic U-tube manometer whereby the first strata of fluids and the second strata of fluids assume equilibrium positions within their respective dielectric spaces in relation to the densities of such fluids and the respective applied pressure forces. The pairs of capacitors comprise all of the capacitance elements of an alternating current Wheatstone bridge circuit. Detection and measurement of the current value of the bridge is translated in linear relationship into a differential pressure value between the pressure forces applied to the manometric instrument.

15 Claims, 6 Drawing Figures

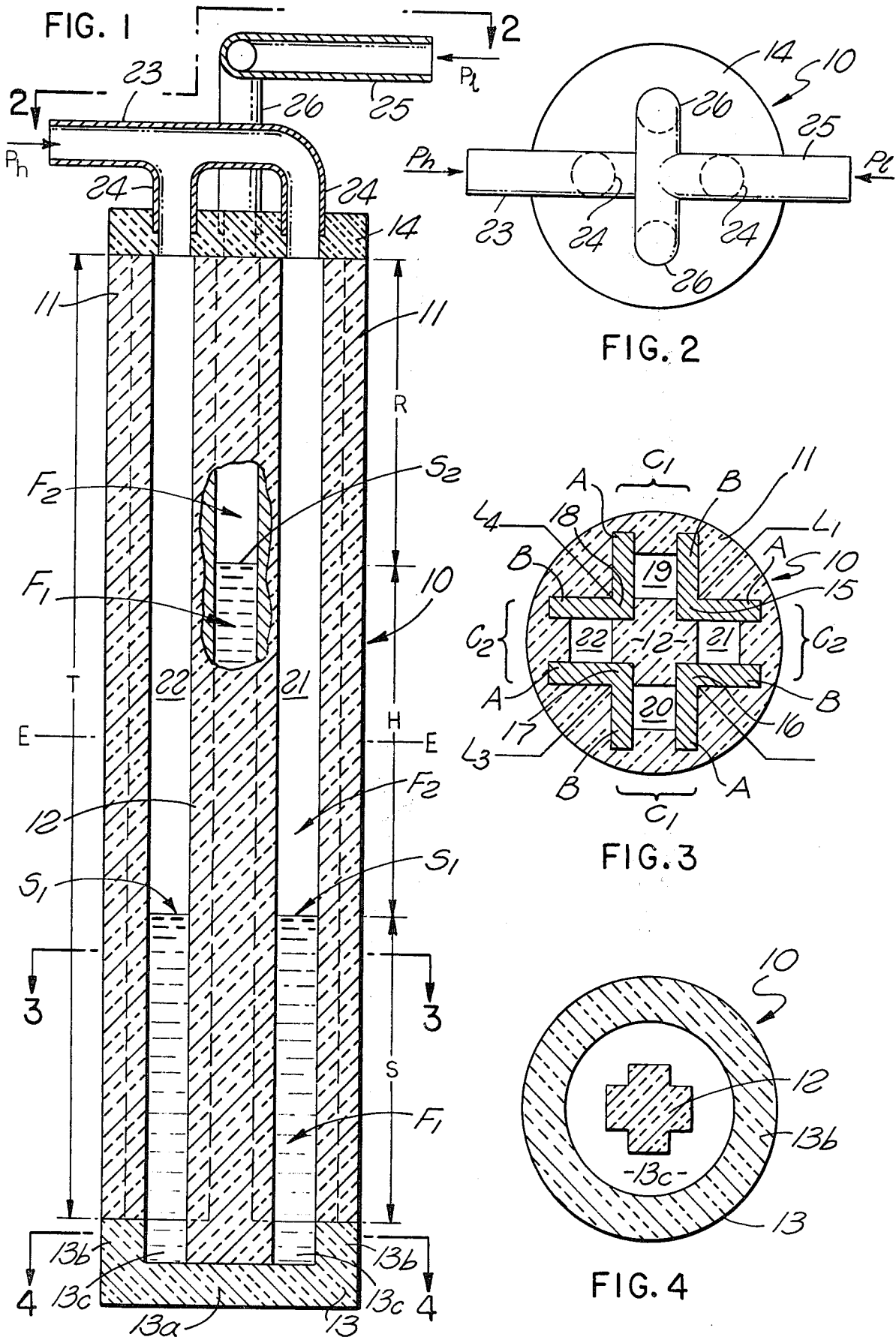

CAPACITIVE SYSTEM FOR MANOMETRIC DETECTION AND MEASUREMENT OF DIFFERENTIAL PRESSURES

BACKGROUND OF THE INVENTION

1. Field of the Invention

The present invention pertains to a novel manometric system for detecting and measuring differential pressures and more particularly relates to an instrument and a method, using a multiplicity of electrical capacitors in a capacitance measuring bridge circuit, for the continuous detection and measuring of differential pressures and reporting the measured pressure difference electronically as a single differential pressure value.

2. Description of the Prior Art

Differential pressure is of interest in a wide variety of monitoring and control applications. The measurements of pressure differential are not only made when pressure must be determined, but also as a basis for inferring the values of other variables and characteristics of gases and liquids.

Many types of devices are available for differential pressure measurement. The devices comprise sensors which respond to properties of the measured media and produce mechanical, pneumatic, or electrical outputs (transductions) for indication and control purposes. In many configurations the sensing and transduction functions are closely coupled and are combined into a single instrument unit.

In general, the sensors used in differential pressure instruments undergo mechanical displacements or deformations as the result of forces exerted by the two media being monitored. The movement is opposed by restoring forces which are typically created by the elastic properties of the sensor, external springs, or by gravity and which establish equilbrium positions characteristic of the differential pressure.

The choice of sensor influences performance specifications such as accuracy, repeatability, range, and overrange, frequency response, operating life, and stability of the instrument. The materials of which the sensors are fabricated also determines the media and temperature ranges to which the instrument can be exposed.

The most common differential pressure sensors are: bellows, diaphragms, bourdon tubes, liquid manometers, and bell gages. The mechanism for converting the displacement or deformation of the sensor (caused by a differential in pressures) into a display or signal output is commonly referred to as a transducer. Typically, the following devices are recognized as basic transduction mechanisms: mechanical linkages, strain gage transducers, potentiometers, inductive transducers, capacitive sensors, force balance transducers and motion balance transducers.

Of the common differential pressure sensors, liquid manometers are the simplest detectors. These sensors comprise containers with liquid fills having two free surfaces; the resultant of the pressures on the surface areas and the weight of the fluid establishes column height. The levels of the two free surfaces are read and subtracted. The differential pressures are products of the subtracted heights and densities of the manometric fluids. Water and low-density oils or alcohols are used for sensitive measurements over narrow pressure ranges; mercury is the preferred liquid for wide pressure ranges. Fill fluids must be specified with properties chemically compatible with the gases or liquids being monitored and they must not freeze or vaporize under operating conditions. The height of the fluid column in most U-tube manometers with transparent (glass) tubes may be read manually to obtain an indication of differential pressure, without any transducer associated with the instrument. Manual recording of fluid heights and calculation of pressure differentials are required for such devices and they must be protected against hazards associated with tube breakage. Where capacitive type transducers have been associated with differential pressure sensors, a number of instrument disadvantages have been observed. Thus, such instruments have been found to be sensitive to temperature change and have high impedance output and a need for complex electronics. The classic capacitance transducers must be reactively as well as resistively balanced. Long lead lengths and moving leads allow stray capacitive impedance pickup and thus variation in the capacitance components of the circuitry. It is often necessary to have a preamplifier close to the transducer.

SUMMARY OF THE INVENTION

The present invention relates to an instrument and a method for continuously detecting and measuring differential fluid pressures of liquids and gases by manometric techniques and sensing, translating and reporting such measurements electrically via unique capacitive transduction techniques comprising an intimate part of the manometric instrument and method. The invention overcomes the deficiencies of prior art manometric pressure differential measuring methods and devices and the deficiencies of capacitive transductance methods and instrumentation by uniquely combining all of the capacitances involved in a classic Wheatstone bridge circuit into the U-tube manometric methodology and instrument structure.

It is an object of the present invention to provide an improved capacitive method and instrumentation for detecting and measuring differential fluid pressures of liquids and gases.

It is a further object of the present invention to provide an improved capacitive type differential pressure measuring method and instrument which incorporates the principals of U-tube manometry.

It is another object of the present invention to provide an improved capacitive type differential pressure test instrument of U-tube manometric structure which can accurately measure gas or liquid pressures and electrically report such measurements at points removed from the instrument.

It is a still further object of the present invention to provide an improved capacitive type method for measuring differential pressures of liquids or gases which is insensitive to environmental changes and to stray capacitances.

Another object of the invention is to provide an improved capacitive type method for continuously detecting and measuring differential pressures of liquids and gases utilizing a U-tube manometer sensor structured of all of the capacitors of a simple alternating current Wheatstone bridge circuit and including detector and direct readout circuitry.

These and other objects of the invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a sectioned elevation view of the capacitive manometric differential pressure measuring instrument of the present invention;

FIG. 2 is a top view of the manometric instrument of FIG. 1;

FIG. 3 is a cross-sectional view of the manometric instrument of the invention taken at line 3—3 of FIG. 1;

FIG. 4 is a cross-sectional view of the manometric instrument of the invention taken at line 4—4 of FIG. 1.

DESCRIPTION OF THE PREFERRED EMBODIMENTS

Figure 5:
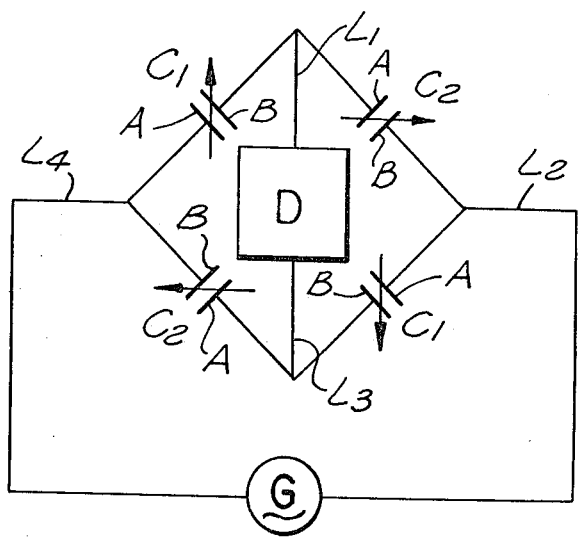
FIG. 5 is a schematic block diagram of circuitry in which the capacitors of the manometric instrument of FIG. 1 are clearly identified in a classic Wheatstone bridge circuit configuration.

The present invention is intended as an improvement on conventional manometric methods and instruments and is broadly suitable for use in measuring pressure differentials of liquids and gases. The method and instrumentation of the invention utilize a uniquely configured arrangement of four elongated plate type capacitors extending in clustered parallel alignment. The capacitors have like closed dielectric spaces which are arranged in pairs. Each pair of dielectric spaces comprises one leg of a typical fluid U-tube manometer.

The four capacitors are constructed from four electrically conductive capacitor elements each comprised of two electrically connected capacitive plates. The capacitor elements are mounted in fixed, equally-spaced relationship from one another and positioned by the instrument body (and associated mounting means) so that each plate of each capacitor element defines with a plate of the next adjacent capacitor element a dielectric space therebetween whereby the mounted capacitor elements together form the four dielectric spaces referred to above. These dielectric spaces are confined by the instrument body and capacitor element mounting means so that such spaces consist of channels for holding the working fluid or fluids of the instrument.

Referring now to the drawings, a multi-capacitor differential pressure manometric instrument 10, in accordance with the present invention, is illustrated in longitudinal cross-section in FIG. 1. As shown, the manometric instrument structure is comprised principally of a non-conducting casing 11 and central non-conducting capacitor element positioning member 12. The casing 11 is closed at its lower end by a header member 13 including bottom wall 13a and annular side wall 13b defining header chamber 13c which surrounds the lower end of positioning member 12. The upper end of the casing 11 is closed by closure plate 14.

Within the instrument casing 11, and as positioned and maintained by member 12, are four like electrically conductive capacitor elements 15, 16 17 and 18 (extending over a length "T" of the casing) each comprised of two capacitive plates "A" and "B". The central positioning member 12 maintains the four capacitor elements in fixed spaced relationship from one another as shown in FIG. 3 and positions such elements so that each plate thereof defines with a plate of the next adjacent capacitor element a dielectric space therebetween whereby such elements together form four dielectric spaces 19, 20, 21 and 22 which are aligned as opposing pairs 19–20 and 21–22. Within these dielectric spaces there is introduced one or more working fluids of differing specific gravities so that an interface level is established which rises or lowers within the instrument 10 in respect to differential pressures imposed upon the instrument. As illustrated in FIG. 1 two fluids $F_1$ and $F_2$ are contained within the dielectric spaces 19, 20, 21 and 22 so that such spaces are always filled with fluid over the length of the capacitor elements and thus the entire range of differential pressures to be measured by the instrument. Thus, a heavy first fluid $F_1$ (relatively high density and specific gravity) is noted to fill the lower portions of such spaces and a second fluid $F_2$ (relatively low density and specific gravity) fills the portions of such spaces above the heavy fluid $F_1$. As shown, fluid $F_2$ comprises the fluid for which differential pressures are to be measured by instrument 10.

The relative positions of the fluids $F_1$ and $F_2$ within spaces 19, 20, 21 and 22 of the instrument 10, as shown in FIG. 1, are established by the relative differential pressures imposed through fluid $F_2$ upon the instrument. Thus, a relatively high pressure $P_h$ is applied to the instrument system as fluid pressure via fluid $F_2$ through high pressure supply line 23 and instrument high pressure inlet lines 24 leading to dielectric spaces 21 and 22. A lower differential pressure $P_l$ is applied to the instrument system as fluid pressure via fluid $F_2$ through low pressure supply line 25 and instrument low pressure inlet lines 26 leading to dielectric spaces 19 and 20. Since the four dielectric spaces are in communication with one another at their lower ends via header chamber 13c the high pressure force $P_h$ on fluid $F_2$ in dielectric spaces 21 and 22 causes such fluid and underlying fluid $F_1$ to be depressed within such spaces thereby forcing fluids to rise in dielectric spaces 19 and 20 against the low pressure force $P_l$ on fluid $F_2$ in such spaces until force equilibrium is reached. Force equilibrium occurs when the applied pressure and weight of the liquid columns on each side of the manometric instrument are of equal force value.

As noted above, the capacitor elements 15, 16, 17 and 18 of te instrument 10 extend over a length T of the casing 11 from the top of chamber 13c in the bottom header 13 to the underside of closure plate 14. Thus, the pairs of dielectric spaces 19–20 and 21–22 act as U-tube type manometer legs with the result that each effective leg of the manometer is of identical cross-sectional area throughout its length.

The capacitive manometric differential pressure measuring instrument of the invention has been described thus far only in terms of its structural equivalency to a classic U-tube manometer. As will be appreciated from study of FIG. 3 of the drawings, the four capacitor elements 15, 16, 17 and 18 of the instrument of the invention are insulated from each other within the instrument structure and from the piping leading fluid streams under differential pressure to the device. Where the fluid $F_1$ and/or the fluid $F_2$ within the instrument 10 comprise electrically conducting material the capacitor elements and capacitive plates A and B are coated with an insulating film thereby preventing the passage of shorting components of current between such plates via the conducting fluids. Electrically conductive led wires $L_1$, $L_2$, $L_3$ and $L_4$ are connected, respectively, to the elements 15, 16, 17 and 18 and leave the instrument 10 via appropriate insulated passage therefrom. When these lead wires are further connected to alternating current generator circuitry "G" and current flow detection, measurement and value indicating circuitry "D", as shown in FIG. 5, there results simple capacitance bridge circuitry of classic Wheatstone configuration.

The alternating current generator circuitry G is connected to the bridge circuitry (the $C_1$ pair of capacitors and the $C_2$ pair of capacitors all contained in an intimate cluster within the instrument casing 11) through screened input lead wires $L_2$ and $L_4$. Outlet wires (screened) $L_1$ and $L_2$ connect the bridge circuitry to the detector circuitry D (including appropriate current rectifier circuitry, if required, bridge interrogation circuitry, current measurement circuitry, and current value indicating circuitry. Because all four capacitors of the bridge circuit are clustered together within the capacitive manometric instrument the circuitry is not subject to stray capacitance and long leads may be used to connect the instrument with the current generator G or the detector, measurement and indicating circuitry D.

In applying the capacitive manometric instrument of this invention to two pressure points for which pressure differential is to be measured and reported and/or recorded a first fluid $F_1$ of relatively high specific gravity is introduced to the dielectric spaces 15, 16 17 and 18 and is allowed to fill such spaces to approximately one-half their height, i.e., to an equilibrium level E—E (see FIG. 1). Thereafter a second fluid $F_2$ of relatively low specific gravity is introduced to the dielectric spaces and is allowed to fill the remaining height of such spaces and the piping connecting the dielectric spaces and the pressure points. The second fluid may be a liquid or gas and may comprise a fluid experiencing two different pressures at separated points in such fluid's container or pipe line, i.e., the fluid for which a differential pressure value needs to be determined. The principal criteria for fluids $F_1$ and $F_2$ are that they are immiscrible with each other and that $F_2$ is lighter than $F_1$. With the two fluids in place and no pressure applied to the system, the frequency and/or voltage of the applied alternating current and/or the detector circuitry (including measuring and/or value indicating instrumentation) may be adjusted in known manner until the value indicating instrumentation indicates the required output value. For identically configured capacitors $C_1$ and $C_2$ bridge balance and zero current flow occurs because each of the identical dielectric spaces 19, 20, 21 and 22 is filled with like quantities of fluids $F_1$ and $F_2$ so that the net dielectric constant values for the material filling such spaces are identical. As a pressure differential is applied to the fluids in the legs of the manometric instrument, the change of volumes of fluids $F_1$ and $F_2$ in the $C_1$ capacitor legs is equal to the change of volumes of fluids $F_2$ and $F_1$, respectively in the $C_2$ capacitor legs and the net dielectric constant values for such capacitor legs changes in linear relationship.

For the bridge circuit of FIG. 5 the respective capacitors may have impedance values as indicated below:
Variable value capacitors
  $C_2$ impedance = $Z_2$
Variable value capacitors
  $C_1$ impedance = $Z_1$ The detector circuitry D also presents an impedance value which may be designated as $Z_3$. The alternating current generator circuitry, at set frequency, has a constant voltage "e" which is applied across the bridge. Thus, If $Z_3$ is of small value, i.e., $Z_3 < Z_1$ and $Z_2$ then it can be established that the current "i" through the detector circuitry is:

$$i = (e\omega \div 2(C_1 - C_2)$$

where
  e is the voltage value and
  $\omega = 2\pi$ frequency

The current value i in the detector circuitry changes in linear relation to changes in the capacitance value of the $C_1$–$C_2$ relationship. Therefore, changes in the $C_1$–$C_2$ relationship may be determined by measuring changes in the current value i. Furthermore, with appropriate detector and a.c. generator circuitry (e.g. by keeping the current i constant and varying the $\omega$ value) the readout of the $C_1$–$C_2$ value can be effected by measuring the period of the angular frequency $\omega$. Thus, the readout instrumentation in the detector circuitry may yield digital pressure values in direct linear relationship to the changes in capacitances $C_1$ and $C_2$.

From the foregoing, it will be appreciated that the bridge circuitry, comprised of the two like and variable value capacitors $C_1$ and the two like and variable value capacitors $C_2$, is arranged to be in an unbalanced state (current flowing through the detection circuit) at all instances when the net capacitance value in the $C_1$ legs varies from the net capacitance value of the $C_2$ legs of the manometric instrument. With the bridge circuitry structured and operating in this fashion the detector circuitry reads the bridge unbalance (value of current flow) linearly as a direct measurement of $F_1$ fluid height difference (H) and the detector circuitry with associated measurement and value indicating circuitry will report or display such difference as a differential pressure value.

EXAMPLE OF ELECTRONIC MANOMETER MEASUREMENT OF DIFFERENTIAL PRESSURES

Figure 6:
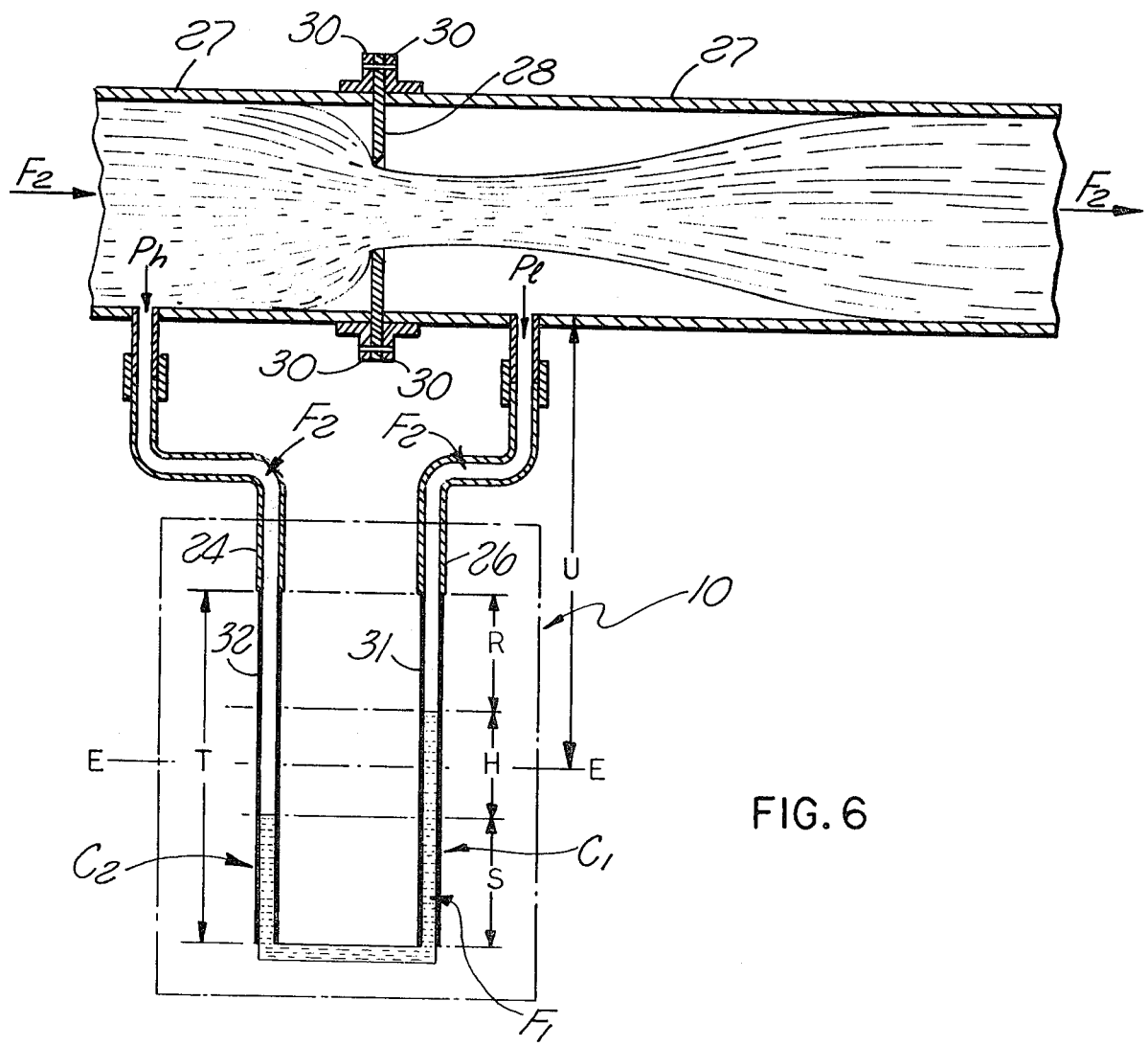
FIG. 6 is a cross-sectional view of an orifice meter in a flowing fluid pipe line including a schematic representation of the manometric instrument of the invention connected to the orifice meter to measure the differential pressure reduction across the meter.

To control industrial processes, it is frequently desirable to know the amount of material entering and leaving the process. Because materials are transported in the form of fluids wherever possible, it is important to measure the rate at which a fluid is flowing through a pipe or other channel. Instruments for measuring streams of flowing fluids include: area meters, current meters, positive-displacement meters, direct weighing and measuring devices and dynamic devices such as venturi meters, orifice meters, flow nozzles and pitot tubes. FIG. 6 shows in sectional view a flowing fluid pipe line 27 in which an orifice plate 28 has been installed between pipe flanges 30 of two sections of such pipe line to form an orifice meter which, in combination with a U-tube manometer can be used to measure fluid flow rate by measurement of differential pressures. In FIG. 6 the capacitive manometric instrument 10 of the invention is shown schematically as a U-tube manometer. Although the actual instrument has two capacitive spaces 19 and 20 about which like capacitances $C_1$ are formed and two capacitive spaces 21 and 22 about which like capacitances $C_2$ are formed, these capacitances are represented, for manometer structure purposes, as singular capacitive legs 31 and 32, respectively, of the schematic manometer of FIG. 6.

The force equations for the manometric system of FIG. 6 are developed as follows:

$$P_h + \rho_2 g(U + \tfrac{1}{2}H) - \rho_1 gH - \rho_2 g(U - \tfrac{1}{2}H) = P_1 \quad (1)$$

$$P_h + \rho_2 gU - \rho_2 g\tfrac{1}{2}H - \rho_1 gH - \rho_2 gU + \rho_2 g\tfrac{1}{2}H = P_1 \quad (2)$$

$$P_h + \rho_2 gH - \rho_1 gH = P_1 \quad (3)$$

$$P_h - P_1 = (\rho_1 - \rho_2)gH \quad (4)$$

Where:
$P_h$ = hgh pressure at the upstream point
$P_1$ = low pressure at the downstream point
$\rho_1$ = density of fluid $F_1$
$\rho_2$ = density of fluid $F_2$
U = the height of fluid $F_2$ in legs 31 and 32 when the system is in equilibrium.
H = the differential of height of fluid $F_1$ in leg 32.
g = acceleration due to gravity Thus, the differential pressure $P_h - P_1$ is a linear function of the differential height of fluid $F_1$ and the difference between the density of fluid $F_1$ and the density of fluid $F_2$. The values of capacitors $C_1$ and $C_2$ are directly and linearly related to the respective heights of the dense fluid $F_1$ and, therefore, the current value of the capacitive bridge circuit of the instrument is directly and linearly related to the height difference (H) of the fluid $F_1$ in the two legs of the manometer. By use of appropriate value indicating circuitry the instrument can report continuously the differential pressure whereby the volumetric flow rate of the fluid in pipe line 27 may be continuously monitored and recorded.

Numerous other examples can be suggested of flowing fluid streams which require monitoring for process or product control purposes with respect to differential pressure and to which the method and instrumentation of this invention can be applied. Where the flowing fluid (liquid, liquid/liquid mixture or emulsion and liquid/solid mixture) is substantially incompressible, the differential capacitance measurement via the manometric instrumentation of the invention is directly related to the pressure differential and monitoring of the fluid and instrumentation yields linear determination of pressure differential. Where the flowing fluid $F_2$ is compressible (such as in the case of gases, liquid/gas mixtures or dispersions or compressible liquids including liquid hydrogen) the same capacitive methodology and instrument structure of the invention is utilized with the detector circuitry calibrated to take into account the relationship between the dielectric constant of the materials and their densities as found by Clausius and Mosotti. This relationship is $(\kappa - 1) \div (\kappa + 2) = \alpha\rho$, where "$\kappa$" is the dielectric constant, "$\alpha$" is the molecular polarizability constant for a particular material, and "$\rho$" is the absolute density of the material. Additionally, $\kappa = C_1/C_0$ where $C_0$ is the capacitance of a capacitor when there is a vacuum between the plates and $C_1$ is the capacitance when the manometric fluid being measured is between the plates. Theoretically, this relation holds for all nonpolar materials regardless of phase.

Where a highly compressible gas comprises the fluid for which differential pressures are to be monitored and measured by the manometric instrument of the invention, it is desirable to utilize a second incompressible fluid within the instrument between the gas and the lower manometric fluid. Thereby, the dielectric spaces of the instrument are always filled with an incompressible strata of fluids under the various pressures imposed on the manometric legs of the instrument by the gas being monitored. As the interface of the strata shifts within a leg (dielectric space) of the instrument the net dielectric constant for the leg changes linearly and the system is not affected by changes in density of a component of the strata under varying pressure force.

As shown in the drawings, the casing 11, capacitive element positioning member 12, bottom header member 13, and closure plate 14 of the manometric instrument 10 are formed of non-conducting materials to provide an insulating supporting structure for the capacitor elements 15, 16, 17, and 18. The various members of the instrument structure are appropriately assembled with seals between such members where required to assure space-to-space separation of the fluids therein. The structural components of the instruments may be formed of electrically conducting material, such as stainless steel, provided the capacitor elements 15, 16, 17 and 18 are fully insulated from the structural components of the instrument.

While the invention has been described in detail with respect to a specified preferred structural embodiment and preferred method of operation, it will be understood by those skilled in the art that various changes and modifications may be made without departing from the spirit and scope of the novel concept of this invention. Therefore, it is intended by the appended claims to cover all such modifications and variations which fall within the true spirit and scope of the invention.

What is claimed is:

1. A manometric method for measuring differential pressures by comparing the dielectric properties of a strata of fluids in a first manometric column with the dielectric properties of a strata of fluids in a second manometric column which comprises:
   (a) providing a multi-capacitor manometric fluid sensor formed of a first pair of capacitors having like dielectric spaces within which a first strata of fluids is maintained as a column under a first pressure force as the dielectric material filling said spaces and a second pair of capacitors having like dielectric space within which a second strata of fluids is maintained as a column under a second pressure force as the dielectric material filling said spaces, the dielectric spaces of said first pair of capacitors and the dielectric spaces of said second pair of capacitors being in fluid flow communications with one another at their lower ends whereby said first strata of fluids and said second strata to fluids assume equilibrium positions within their respective dielectric spaces in relation to the densities of said fluids and the respective pressure forces applied to the columns thereof;
   (b) connecting the first and second pairs of capacitors of said sensor together to form the four capacitive sides of a Wheatstone bridge circuit, the first pair of capacitors connected as two opposing sides of said bridge and the second pair of capacitors connected as the remaining two opposing sides of said bridge;
   (c) applying a source of alternating current of constant voltage and set frequency across said bridge circuit to a first set of bridge terminals at opposite corners of the bridge, each of said first terminals located between a capacitor of the first pair of capacitors and a capacitor of the second pair of capacitors of said sensor;

(d) interrogating the bridge circuit through a detection circuit connected across said bridge to a second set of bridge terminals independent of said first set of terminals and at opposite corners of the bridge, each of said second terminals located between a capacitor of the first pair of capacitors and a capacitor of the second pair of capacitors of said sensor; and (e) measuring the current value in said detection circuit and indicating said value as a deviation value of capacitance value of the first column of fluids under said first pressure force with respect to the capacitance value of the second column of fluids under said second pressure force in direct linear relationship with said current value.

2. A manometric method for measuring differential pressures by comparing the dielectric properties of a strata of fluids in a first manometric column with the dielectric properties of a strata of fluids in a second manometric column as defined in claim 1 wherein the current value measured in said detection circuit is indicated as a deviation value of capacitance value of the first column of fluids under said first pressure force with respect to the capacitance value of the second column of fluids under said second pressure force and is expressed in direct linear relationship with said current value as a deviation of the height of said first column of fluids with respect to the height said second column of fluids.

3. A manometric method for measuring differential pressures by comparing the dielectric properties of a strata of fluids in a first manometric column with the dielectric properties of a strata of fluids in a second manometric column as defined in claim 1 wherein the current value measured in said detection circuit is indicated as a deviation value of capacitance value of the first column of fluids under said first pressure force with respect to the capacitance value of the second column of fluids under said second pressure force and is expressed in direct linear relationship with said current value as a deviation of pressure force applied to said first column of fluids with respect to the pressure force applied to said second column of fluids.

4. A manometric method for measuring differential pressures by comparing the dielectric properties of a strata of fluids in a first manometric column with the dielectric properties of a strata of fluids in a second manometric column as defined in claim 3 wherein the current value measured in said detection circuit is indicated as a deviation of pressure force applied to said first column of fluids with respect to the pressure force applied to said second column of fluids in direct digital readout display.

5. A manometric method for measuring differential pressures by comparing the dielectric properties of a strata of fluids in a first manometric column with the dielectric properties of a strata of fluids in a second manometric column as defined in claim 3 wherein the current value measured in said detection circuit is indicated as a deviation of pressure force applied to said first column of fluids with respect to the pressure force applied to said second column of fluids in direct analog display.

6. A manometric method for measuring differential pressures by comparing the dielectric properties of a strata of fluids in a first manometric column with the dielectric properties of a strata of fluids in a second manometric column as defined in claim 1 wherein the lower fluid stratum of said first column of fluids is the same as and is in communication with the lower fluid stratum of said second column of fluids, the upper fluid stratum of said first column of fluids has a lower density than the lower fluid stratum of said column and is immiscible therewith, and the upper fluid stratum of said second column of fluids has a lower density than the lower fluid stratum of said column and is immiscible therewith.

7. A capacitive system for manometric measurement of differential pressures by comparing the dielectric properties of a strata of fluids in a first manometric column with the dielectric properties of a strata of fluids in a second manometric column which comprises:

(a) a multi-capacitor manometric fluid sensor formed of
  (i) a first pair of capacitors having like dielectric spaces,
  (ii) means for maintaining a first strata of fluids as a column within the dielectric spaces of said first pair of capacitors whereby said capacitors have like and variable capacitive value,
  (iii) a second pair of capacitors having like dielectric spaces,
  (iv) means for maintaining a second strata of fluids as a column within the dielectric spaces of said second pair of capacitors whereby said capacitors have like and variable capacitive value, and
  (v) fluid passage means connecting the dielectric spaces of said first pair of capacitors at the lower end of said spaces with the dielectric spaces of said second pair of capacitors at the lower end of said spaces;

(b) means for applying a first pressure force to said first column of fluids and for applying a second pressure force to said second column of fluids whereby with the application of said pressure forces to said columns of fluids of said first strata of fluids and said second strata of fluids assume equilibrium positions within their respective dielectric spaces in relation to the densities of said fluids and the respective pressure forces applied to said columns;

(c) means electrically connecting the first and second pairs of capacitors of said sensor together to form the four capacitive sides of a Wheatstone bridge circuit, the first pair of capacitors connected as two opposing sides of said bridge and the second pair of capacitors connected as the remaining two opposing sides of said bridge;

(d) a source of alternating current of constant voltage and set frequency connected across said bridge circuit to a first set of bridge terminals at opposite corners of the bridge, each of said first terminals located between a capacitor of the first pair of capacitors and a capacitor of the second pair of capacitors of said sensor; and (e) a current detection circuit connected across the bridge to a second set of terminals independent of said first set of terminals and at opposite corners of the bridge, each of said second terminals located between a capacitor of the first pair of capacitors and a capacitor of the second pair of capacitors of said sensor, said detection circuit including current value measurement and current value indication circuitry for expressing in direct linear relationship said current value as a deviation value of capacitance value of the first column of fluids under said first pressure force with respect to the capacitance value of the second column of fluids under said second pressure force.

8. A capacitive system for manometric measurement of differential pressures by comparing the dielectric properties of a strata of fluids in a first manometric column with the dielectric properties of a strata of fluids in a second manometric column as claimed in claim 7 wherein the current detection circuit including current value measurement and current value indication circuitry expresses the deviation value of capacitance value of the first column of fluids under said first pressure force with respect to the capacitance value of the second column of fluids under said second pressure force as the pressure differential value between said first pressure force and said second pressure force.

9. A capacitive system for manometric measurement of differential pressures by comparing the dielectric properties of a strata of fluids in a first manometric column with the dielectric properties of a strata of fluids in a second manometric column as claimed in claims 7 or 8 wherein the first and second pairs of capacitors forming the multi-capacitor sensor of said system are coated with an insulating film.

10. A capacitive system for manometric measurement of differential pressures by comparing the dielectric properties of a strata of fluids in a first manometric column with the dielectric properties of a strata of fluids in a second manometric column as claimed in claim 8 wherein the current value indication circuitry reports the pressure differential value between said first pressure force and said second pressure force in direct digital readout display.

11. A capacitive system for manometric measurement of differential pressures by comparing the dielectric properties of a strata of fluids in a first manometric column with the dielectric properties of a strata of fluids in a second manometric column as claimed in claim 8 wherein the current value indication circuitry reports the pressure differential value between said first pressure force and said second pressure force in direct analog display.

12. A capacitive type manometric instrument for measuring differential pressures by comparing the dielectric properties of a strata of fluids in a first manometric column with the dielectric properties of a strata of fluids in a second manometric column which comprises:
(a) four electrically conductive capacitor elements each formed to present two electrically connected capacitive plates;
(b) means for mounting said capacitor elements in fixed spaced relationship from one another and for positioning said elements so that each capacitive plate thereof defines with a capacitive plate of the next adjacent capacitor element a dielectric space therebetween whereby said mounted capacitor elements with their respective plates together form four plate-type capacitors having like dielectric spaces;
(c) means for maintaining a first strata of fluids as a column within the dielectric spaces of a first pair of said capacitors whereby said capacitors have like and variable capacitive value;
(d) means for maintaining a second strata of fluids as a column within the dielectric spaces of a second pair of said capacitors whereby said capacitors have like and variable capacitive value;
(e) fluid passage means connecting the dielectric spaces of first pair of capacitors at the lower end of said spaces with the dielectric spaces of said second pair of capacitors at the lower end of said spaces;
(f) means for applying a first pressure force to said first column of fluids and for applying a second pressure force to said second column of fluids whereby with the application of said pressure forces to said columns of fluids said first strata of fluids and said second strata of fluids assume equilibrium positions within their respective dielectric spaces in relation to the densities of said fluids and the respective pressure forces applied to said columns;
(g) means for electrically connecting the first and second pairs of capacitors of said manometric instrument together to form the four capacitive sides of a Wheatstone bridge circuit, the first pair of capacitors connected as two opposing sides of said bridge and the second pair of capacitors connected as the remaining two opposing sides of said bridge;
(h) means for applying a source of alternating current of constant voltage and set frequency across said bridge circuit at a first set of bridge terminals at opposite corners of the bridge, each of said first terminals located between a capacitor of the first pair of capacitors and a capacitor of the second pair of capacitors of said manometric instrument; and
(i) means for detecting and measuring current flow within the bridge circuit, said means being connected across said bridge circuit at a second set of bridge terminals independent of said first set of terminals and at opposite corners of the bridge, each of said second terminals located between a capacitor of the first pair of capacitors and a capacitor of the second pair of capacitors of said manometric instrument, said current detecting and measuring means including current value indicating circuitry for expressing in direct linear relationship said current value as the pressure differential value between said first pressure force and said second pressure force.

13. A capacitive type manometric instrument for measuring differential pressures by comparing the dielectric properties of a strata of fluids in a first manometric column with the dielectric properties of a strata of fluids in a second manometric column as claimed in claim 12 wherein the four electrically conductive capacitor elements each consist of a rectangular metallic sheet folded along a line midway the edges thereof to form said electrically connected capacitive plates.

14. A capacitive type manometric instrument for measuring differential pressures by comparing the dielectric properties of a strata of fluids in a first manometric column with the dielectric properties of a strata of fluids in a second manometric column as claimed in claim 12 wherein the four electrically conductive capacitor elements each consists of an elongated metallic sheet folded 90° along a line midway the edges thereof to form said electrically connected capacitive plates.

15. A capacitive type manometric instrument for measuring differential pressures by comparing the dielectric properties of a strata of fluids in a first manometric column with the dielectric properties of a strata of fluids in a second manometric column as claimed in claim 12 wherein the four electrically conductive capacitor elements are coated with an insulating film.

* * * * *